(12) United States Patent
Ugurlu et al.

(10) Patent No.: US 10,945,256 B2
(45) Date of Patent: Mar. 9, 2021

(54) METHOD AND APPARATUS FOR REPORTING HYBRID AUTOMATIC REPEAT REQUEST-ACKNOWLEDGEMENT INFORMATION FOR DIFFERENT SERVICE TYPES IN MOBILE COMMUNICATIONS

(71) Applicant: MediaTek Singapore Pte. Ltd., Singapore (SG)

(72) Inventors: Ahmet Umut Ugurlu, Cambridge (GB); Raghavendra Madanahally Ramakrishna, Cambridge (GB); Abdellatif Salah, Cambridge (GB)

(73) Assignee: MediaTek Singapore Pte. Ltd., Singapore (SG)

( * ) Notice: Subject to any disclaimer, the term of this patent is extended or adjusted under 35 U.S.C. 154(b) by 0 days.

(21) Appl. No.: 16/420,121

(22) Filed: May 22, 2019

(65) Prior Publication Data
US 2019/0364543 A1 Nov. 28, 2019

Related U.S. Application Data

(60) Provisional application No. 62/674,686, filed on May 22, 2018.

(51) Int. Cl.
*H04W 72/04* (2009.01)
*H04L 5/00* (2006.01)
(Continued)

(52) U.S. Cl.
CPC ......... *H04W 72/042* (2013.01); *H04L 1/1819* (2013.01); *H04L 5/0055* (2013.01); *H04W 72/0446* (2013.01); *H04W 76/11* (2018.02)

(58) Field of Classification Search
None
See application file for complete search history.

(56) References Cited

U.S. PATENT DOCUMENTS

2018/0019843 A1* 1/2018 Papasakellariou ... H04B 7/0413
2018/0139734 A1* 5/2018 Babaei ............. H04W 72/0406
(Continued)

FOREIGN PATENT DOCUMENTS

CN 105979597 A 9/2016
WO WO 2017172789 A1 10/2017
(Continued)

OTHER PUBLICATIONS

Taiwan Intellectual Property Office, Office Action for Taiwan Patent Application No. 108117612, dated May 11, 2020.
(Continued)

*Primary Examiner* — Chi H Pham
*Assistant Examiner* — Vladislav Y Agureyev
(74) *Attorney, Agent, or Firm* — Han IP PLLC; Andy M. Han

(57) ABSTRACT

Various solutions for reporting hybrid automatic repeat request-acknowledgement (HARQ-ACK) information for different service types with respect to user equipment and network apparatus in mobile communications are described. An apparatus may receive downlink control information (DCI). The apparatus may determine a service type according to the DCI. The apparatus may select a physical uplink control channel (PUCCH) resource according to the service type. The apparatus may transmit HARQ-ACK information in the PUCCH resource.

16 Claims, 3 Drawing Sheets

(51) Int. Cl.
*H04L 1/18* (2006.01)
*H04W 76/11* (2018.01)

(56) References Cited

U.S. PATENT DOCUMENTS

| | | | | |
|---|---|---|---|---|
| 2018/0139773 | A1* | 5/2018 | Ma | H04L 5/0094 |
| 2019/0068317 | A1* | 2/2019 | Babaei | H04W 72/14 |
| 2019/0098654 | A1* | 3/2019 | Li | H04B 17/309 |
| 2019/0268120 | A1* | 8/2019 | Gao | H04L 1/0061 |
| 2019/0306852 | A1* | 10/2019 | Nayeb Nazar | H04W 72/0413 |
| 2019/0327755 | A1* | 10/2019 | Xiong | H04L 5/0055 |
| 2019/0349973 | A1* | 11/2019 | Yang | H04W 72/1257 |
| 2019/0357178 | A1* | 11/2019 | Bae | H04L 5/0051 |
| 2019/0357238 | A1* | 11/2019 | Zhou | H04W 72/042 |
| 2020/0037350 | A1* | 1/2020 | Park | H04W 72/12 |
| 2020/0059821 | A1* | 2/2020 | Wirth | H04L 5/0094 |
| 2020/0077470 | A1* | 3/2020 | Xiong | H04L 1/1854 |
| 2020/0107301 | A1* | 4/2020 | Chen | H04L 69/324 |
| 2020/0195386 | A1* | 6/2020 | Marinier | H04L 1/1845 |
| 2020/0196343 | A1* | 6/2020 | Marinier | H04L 1/1854 |
| 2020/0221489 | A1* | 7/2020 | Babaei | H04W 76/38 |
| 2020/0228230 | A1* | 7/2020 | Mukherjee | H04L 1/1896 |

FOREIGN PATENT DOCUMENTS

| | | |
|---|---|---|
| WO | WO 2017196059 A1 | 11/2017 |
| WO | WO 2018080212 A2 | 5/2018 |

OTHER PUBLICATIONS

China National Intellectual Property Administration, International Search Report and Written Opinion for International Patent Application No. PCT/CN2019/087967, dated Aug. 23, 2019.

* cited by examiner

METHOD AND APPARATUS FOR REPORTING HYBRID AUTOMATIC REPEAT REQUEST-ACKNOWLEDGEMENT INFORMATION FOR DIFFERENT SERVICE TYPES IN MOBILE COMMUNICATIONS

CROSS REFERENCE TO RELATED PATENT APPLICATION(S)

The present disclosure is part of a non-provisional application claiming the priority benefit of U.S. Patent Application No. 62/674,686, filed on 22 May 2018, the content of which is incorporated by reference in its entirety.

TECHNICAL FIELD

The present disclosure is generally related to mobile communications and, more particularly, to reporting hybrid automatic repeat request-acknowledgement (HARQ-ACK) information for different service types with respect to user equipment and network apparatus in mobile communications.

BACKGROUND

Unless otherwise indicated herein, approaches described in this section are not prior art to the claims listed below and are not admitted as prior art by inclusion in this section.

In Long-Term Evolution (LTE) or New Radio (NR), hybrid automatic repeat request-acknowledgement (HARQ-ACK) information transmission is introduced to improve transmission reliability. The user equipment (UE) needs to report HARQ-ACK information for corresponding downlink receptions in a HARQ-ACK codebook. The HARQ-ACK codebook should be transmitted in a slot indicated by a value of a HARQ feedback timing indicator field in a corresponding downlink control information (DCI) format. The DCI format should also indicate the physical uplink control channel (PUCCH) resource scheduled for the HARQ-ACK information transmission. HARQ-ACK multiplexing can be used to facilitate HARQ-ACK information transmission. Multiple HARQ-ACK feedbacks corresponding to multiple physical downlink shared channel (PDSCH) transmissions may be accumulated, multiplexed and transmitted to the network apparatus at once. One PUCCH resource may be used to carry multiple HARQ-ACK feedbacks to be transmitted in the same slot.

In NR, the framework of transmission of HARQ feedback bits is based on RRC-configured resource sets at UE, each containing a group of resources. Each resource in a resource set is associated with a PUCCH format, a first symbol, and a PUCCH transmission duration. UE is indicated a HARQ-ACK resource indicator in each scheduling DCI. HARQ-ACK feedbacks for different transmissions can be multiplexed at UE. UE determines the required number of HARQ-ACK bits, and the corresponding resource set is selected according to higher-layer parameters.

However, the current framework of transmission of HARQ feedback bits is not suitable for ultra-reliable and low latency communications (URLLC). URLLC is introduced for emerging applications that demands high requirements on end-to-end latency and reliability. A general URLLC reliability requirement is that a packet of size 32 bytes shall be transmitted within 1 millisecond end-to-end latency with a success probability of $10^{-5}$. URLLC traffic is typically sporadic and short whereas low-latency and high-reliability requirements are stringent. For example, the control reliability of URLLC has to be stricter than the data reliability which is up to $10^{-6}$ BLER. Accordingly, using only one PUCCH resource for HARQ feedback bits transmission in an uplink slot will add to transmission latency. Different reliability aspects required for different service types are also variant. In spectral efficiency, URLLC HARQ feedback may require more PRB allocation for reliability whereas Enhanced Mobile Broadband (eMBB) HARQ feedback is likely to require narrower frequency-domain allocation.

Accordingly, how to differentiate the service type dynamically may become an important issue for reporting HARQ-ACK information. Therefore, it is needed to provide proper schemes to report HARQ-ACK information for different service types.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to propose solutions or schemes that address the aforementioned issues pertaining to reporting HARQ-ACK information for different service types with respect to user equipment and network apparatus in mobile communications.

In one aspect, a method may involve an apparatus receiving DCI. The method may also involve the apparatus determining a service type according to the DCI. The method may further involve the apparatus selecting a PUCCH resource according to the service type. The method may further involve the apparatus transmitting HARQ-ACK information in the PUCCH resource.

In one aspect, an apparatus may comprise a transceiver capable of wirelessly communicating with a network node of a wireless network. The apparatus may also comprise a processor communicatively coupled to the transceiver. The processor may be capable of receiving, via the transceiver, a DCI. The processor may also be capable of determining a service type according to the DCI. The processor may further be capable of selecting a PUCCH resource according to the service type. The processor may further be capable of transmitting, via the transceiver, HARQ-ACK information in the PUCCH resource.

It is noteworthy that, although description provided herein may be in the context of certain radio access technologies, networks and network topologies such as Long-Term Evolution (LTE), LTE-Advanced, LTE-Advanced Pro, 5th Generation (5G), New Radio (NR), Internet-of-Things (IoT) and Narrow Band Internet of Things (NB-IoT), the proposed concepts, schemes and any variation(s)/derivative(s) thereof may be implemented in, for and by other types of radio access technologies, networks and network topologies. Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION OF PREFERRED IMPLEMENTATIONS

Figure 1:
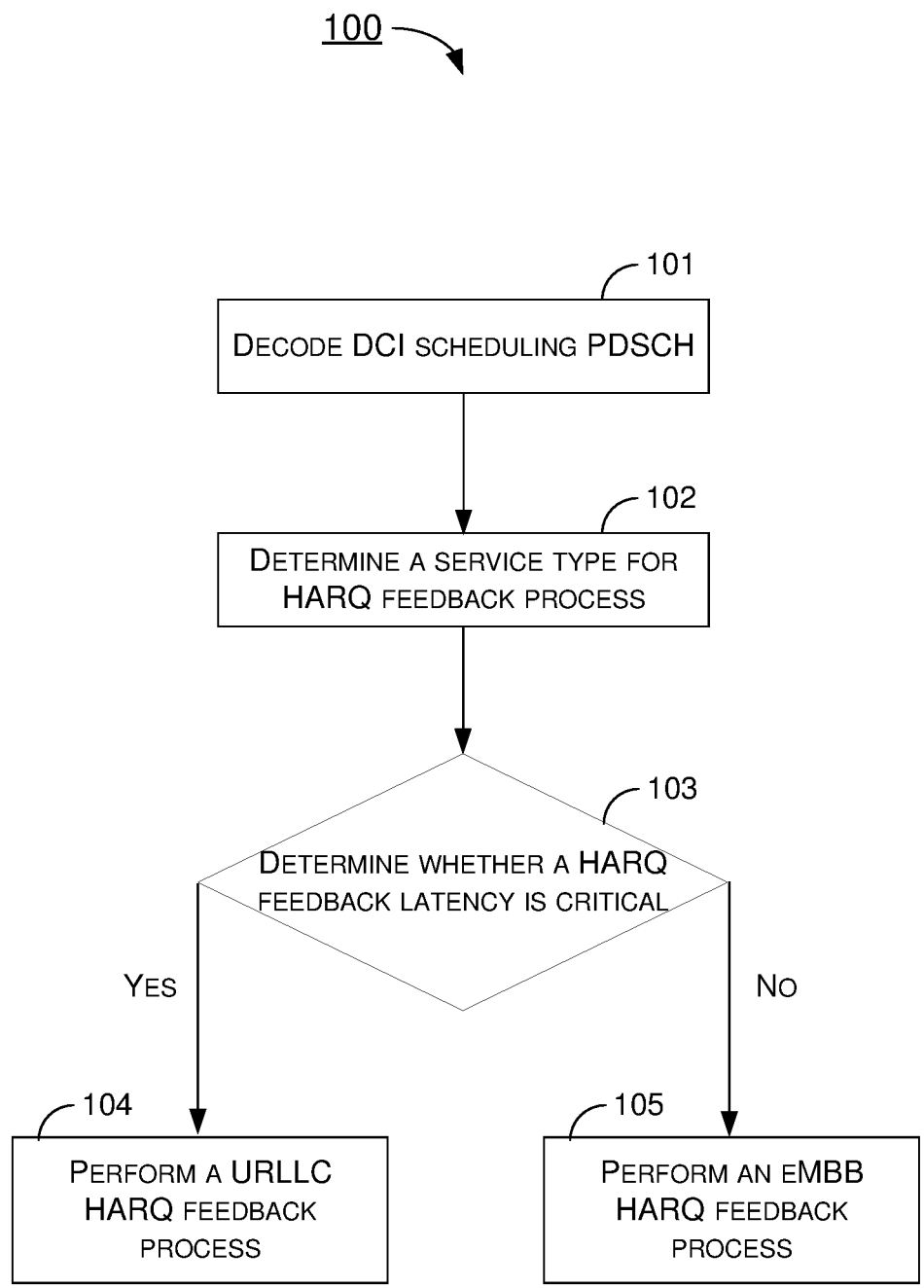
FIG. 1 is a diagram depicting an example scheme under schemes in accordance with implementations of the present disclosure.

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to reporting HARQ-ACK information for different service types with respect to user equipment and network apparatus in mobile communications. According to the present disclosure, a number of possible solutions may be implemented separately or jointly. That is, although these possible solutions may be described below separately, two or more of these possible solutions may be implemented in one combination or another.

In LTE or NR, HARQ-ACK information transmission is introduced to improve transmission reliability. The UE needs to report HARQ-ACK information for corresponding downlink receptions in a HARQ-ACK codebook. The HARQ-ACK codebook should be transmitted in a slot indicated by a value of a HARQ feedback timing indicator field in a corresponding DCI format. The DCI format should also indicate the PUCCH resource scheduled for the HARQ-ACK information transmission. HARQ-ACK multiplexing can be used to facilitate HARQ-ACK information transmission. Multiple HARQ-ACK feedbacks corresponding to multiple PDSCH transmissions may be accumulated, multiplexed and transmitted to the network apparatus at once. One PUCCH resource may be used to carry multiple HARQ-ACK feedbacks to be transmitted in the same slot.

In NR, the framework of transmission of HARQ feedback bits is based on RRC-configured resource sets at UE, each containing a group of resources. Each resource in a resource set is associated with a PUCCH format, a first symbol, and a PUCCH transmission duration. UE is indicated a HARQ-ACK resource indicator in each scheduling DCI. HARQ-ACK feedbacks for different transmissions can be multiplexed at UE. UE determines the required number of HARQ-ACK bits, and the corresponding resource set is selected according to higher-layer parameters.

However, the current framework of transmission of HARQ feedback bits is not suitable for URLLC. URLLC is introduced for emerging applications that demands high requirements on end-to-end latency and reliability. A general URLLC reliability requirement is that a packet of size 32 bytes shall be transmitted within 1 millisecond end-to-end latency with a success probability of $10^{-5}$. URLLC traffic is typically sporadic and short whereas low-latency and high-reliability requirements are stringent. For example, the control reliability of URLLC has to be stricter than the data reliability which is up to $10^{-6}$ BLER. Accordingly, using only one PUCCH resource for HARQ feedback bits transmission in an uplink slot will add to transmission latency. Different reliability aspects required for different service types are also variant. In spectral efficiency, URLLC HARQ feedback may require more PRB allocation for reliability whereas eMBB HARQ feedback is likely to require narrower frequency-domain allocation.

A UE may be served with both eMBB and URLLC traffics. How to differentiate the service type dynamically may become an important issue for reporting HARQ-ACK information. In view of the above, the present disclosure proposes a number of schemes regarding reporting HARQ-ACK information for different service types with respect to the UE and the network apparatus. According to the schemes of the present disclosure, the UE may be able to recognize a service type of a scheduled transmission from a DCI. The UE may also be able to properly report HARQ-ACK information according to the determined service type.

FIG. 1 illustrates an example scheme 100 in accordance with implementations of the present disclosure. Scheme 100 may involve a UE and a network nodes, which may be a part of a wireless communication network (e.g., an LTE network, an LTE-Advanced network, an LTE-Advanced Pro network, a 5G network, an NR network, an IoT network or an NB-IoT network). The UE may be configured to establish at least one connection with the network node. The UE may be configured with URLLC and/or eMBB services. The UE may receive a DCI from the network node. The DCI may schedule a downlink transmission (e.g., PDSCH) corresponding to the URLLC and/or eMBB services.

Referring to FIG. 1, scheme 100 may involve a number of operations and/or actions performed by the UE for reporting HARQ-ACK information for different service types as represented by one or more of blocks 101, 102, 103, 104 and 105. Although illustrated as discrete blocks, various blocks of scheme 100 may be divided into additional blocks, combined into fewer blocks, or eliminated, depending on the desired implementation. Scheme 100 may be implemented by communication apparatus 210 described below. Scheme 100 may begin at 101.

At 101, after receiving the DCI, the UE may be configured to decode the DCI scheduling the PDSCH. Scheme 100 may proceed from 101 to 102.

At 102, the UE may be configured to determine a service type corresponding to the PDSCH for HARQ feedback process. Since the UE may be configured with the URLLC and/or eMBB services and different service types may correspond to different HARQ feedback processes, the UE may need to determine the service type of the downlink transmission scheduled by the DCI. Scheme 100 may proceed from 102 to 103.

At 103, the UE may be configured to determine whether a HARQ feedback latency is critical. Different service types may have different HARQ feedback latency requirements. For example, the HARQ feedback latency requirement of URLLC service should more critical than the HARQ feedback latency requirement of eMBB service. In an event that the HARQ feedback latency is critical, scheme 100 may proceed from 103 to 104. In an event that the HARQ feedback latency is not critical, scheme 100 may proceed from 103 to 105.

At 104, the UE may be configured to perform a URLLC HARQ feedback process. The UE may report the HARQ-ACK information more instantaneous to reduce latency and meet the HARQ feedback latency requirement of URLLC service.

At 105, the UE may be configured to perform an eMBB HARQ feedback process. The UE may be able to report the HARQ-ACK information regularly or in a HARQ-ACK codebook since the HARQ feedback latency requirement of eMBB service is not critical.

In an event that a UE is assigned with eMBB and URLLC services and the scheduling grant for the URLLC and eMBB transmissions are included in the same HARQ-ACK codebook, it is preferable not to multiplex the HARQ-ACK feedback bits in the same PUCCH resource since the URLLC service requires lower latency and higher reliability than the eMBB service. This requires a mechanism and design for UE recognition of service types based on the scheduling DCI. After receiving the DCI from the network node, the UE may be configured to determine a service type according to the DCI. Then, the UE may adaptively select a PUCCH resource according to the service type. The UE may transmit the HARQ-ACK information in the selected PUCCH resource.

Specifically, the UE may be configured to determine/recognize a service type of a scheduled transmission based on some properties of the DCI. For example, the UE may be configured to determine the service type according to a radio network temporary identifier (RNTI) used by the DCI. A specific RNTI may be defined for the URLLC service. In an event that the same DCI format for scheduling is scrambled with a service-specific RNTI for URLLC, the UE may be able to implicitly recognize the associated service type of the scheduling DCI based on which RNTI can successfully decode the scheduling DCI.

Alternatively, the UE may be configured to determine the service type according to a PDCCH search space or a type of a PDCCH search space for the DCI. A UE-specific PDCCH search space may be configured in a control-resource set (CORESET). The UE may be configured with multiple search spaces for different PDCCH candidates. In NR, the configuration of a UE-specific search space for a PDCCH may be configured by UE-specific radio resource control (RRC) signal. In an event that the scheduling DCI for URLLC and eMBB services are positioned in different PDCCH search spaces, the UE may be able to identify the correct DCI for each corresponding service type. The PDCCH search space restrictions may be pre-determined (e.g., defined by NR specification). For example, one way to specify the PDCCH search space is to restrict the DCI for URLLC to certain aggregation levels or to certain control channel elements (CCEs). Another way to specify the PDCCH search space is to do the restriction based on orthogonal frequency-division multiplexing (OFDM) symbol numbers.

In an event that UE detects multiple scheduling DCI in a CORESET, the UE may be configured to recognize them based on the specified/pre-determined rules. For example, the DCI for URLLC may be always configured at an earlier OFDM symbol than DCI for eMBB. The UE may be configured to determine different service types according to different DCI positions. The PDCCH search space restrictions may also be signalled by RRC signalling. For example, another way to specify the PDCCH search space is to signal the configurable service types by scheduling DCI in a certain PDCCH search space. This may be signalled in the same RRC message configuring the UE-specific PDCCH search spaces. Furthermore, the PDCCH search space restrictions may also be extended to a dedicated CORESET. For example, a certain CORESET monitoring occasion may also be used to identify a service-type.

Alternatively, the UE may be configured to determine the service type according to at least one of a DCI format of the DCI, a DCI field of the DCI, and a payload size of the DCI. For example, in an event that a different or specific DCI format is defined specifically for the scheduling DCI for URLLC, the corresponding service type may be identified from the DCI format. A compact-sized DCI with a small payload size may be used for the URLLC service. In another example, a certain DCI field (e.g., modulation and coding scheme (MCS) table, number of bits in a certain field, etc.) may be used by UE to determine whether the DCI schedules a URLLC or eMBB transmission, therefore service-type may be identified implicitly. In another example, the DCI scheduling URLLC should have smaller payload size than the DCI scheduling eMBB. The UE may be able to differentiate different service types according to different payload sizes. Different mechanisms for UE indication of payload size may be considered and any of such indication may also be interpreted by the UE to identify service type.

Different PUCCH resources for uplink transmission of HARQ feedback bits may be configured for different service type traffics. A dedicated PUCCH resource set may be configured for high-priority (e.g., URLLC) service types. One or more PUCCH resource sets may be configured to be restricted only for URLLC-type services. UE procedures of selecting a PUCCH resource set may involve determining the service type as well as the required number of bits. For example, the network node may configure the dedicated PUCCH resource sets only with PUCCH resources that are configured as short-PUCCH formats. The UE may be able to select these PUCCH resources for transmitting the HARQ-ACK information corresponding to URLLC service. For example, the UE may be configured to select a URLLC-specific PUCCH resource in an event that the service type is the URLLC service. In another example, the UE may be configured to select a nearest PUCCH resource in time in an event that the service type is the URLLC service. Accordingly, latency may be reduced as the UE can transmit HARQ bits in the nearest resource scheduled by RRC for layer 1 (L1) signalling. Reliability of HARQ bits of different service types may also be properly handled.

After the PUCCH resource set is determined, the selection of the PUCCH resource may be based on a combination of a K1 parameter and a PDSCH time-domain resource assignment field. The UE may be configured to select the PUCCH resource (e.g., HARQ-ACK resource) according to at least one of a slot or symbol indication (e.g., K1 parameter) and a time-domain resource assignment. Specifically, the K1 parameter may indicate the slot for the HARQ-ACK resource. The last symbol of the PDSCH transmission may indicate the first symbol of the HARQ-ACK resource or the first available HARQ-ACK symbol after the last PDSCH symbol index. For example, in an event that K1 is equal to 1, the UE may be configured to select the HARQ-ACK resource on the next symbol index after the last PDSCH symbol index in the next slot. The time offset in terms of number of symbols between the last PDSCH transmission symbol index and HARQ-ACK resource may be based on UE capability. The capability may be a single value or different values for different subcarrier-spacing configurations. In another example, a supplementary parameter (e.g., similar to K1 but in terms of symbols) may be configured at UE via RRC signalling. This new parameter (e.g., K'1) may not be smaller than the 1 capability for the UE and semi-statically configured. In this case, the first HARQ-ACK resource in time-domain after the K'1 offset from the last symbol of the PDSCH transmission may be selected by UE.

Alternatively, the last symbol of the PDSCH transmission may indicate the first symbol of the HARQ-ACK resource or the first available HARQ-ACK symbol after the last PDSCH symbol index only in an event that the K1 parameter is equal to 0. Otherwise, an acknowledgement resource indicator (ARI) field may be used to indicate the HARQ-ACK resource. In some implementations, both the last and first symbol of the PDSCH transmission may be used to determine the first symbol of the HARQ-ACK resource. Accordingly, the ARI field in DCI may not be necessary, which may help reduce DCI payload size for URLLC and hence gain better decoding reliability.

As mentioned above, URLLC HARQ-ACK feedback bits may be not allowed to be multiplexed with eMBB HARQ-ACK feedback bits due to different latency and reliability requirements. However, HARQ-ACK bits for different URLLC transmissions may be multiplexed depending on the service requirements and configured PUCCH resources. Therefore, the UE may be configured to cancel a multiplexing of HARQ-ACK feedback bits corresponding to the URLLC service. Alternatively, the UE may be configured to multiplex HARQ-ACK feedback bits corresponding to the URLLC service according to at least one of a slot or symbol indication and a time-domain resource assignment. The network node may use a higher-layer (e.g., RRC layer) parameter to configure whether the UE is allowed to multiplex HARQ-ACK feedback bits corresponding to the URLLC service.

For example, the UE may be configured to multiplex HARQ-ACK feedback bits corresponding to the URLLC service according to the K1 parameter. The K1 parameter may be defined in terms of symbols or slots. In an event that at least two K1 parameters indicate to the same symbol or slot, the UE may be configured to multiplex the corresponding HARQ-ACK feedback bits and transmit the HARQ-ACK feedback bits to the network node together. In another example, the UE may be configured to multiplex HARQ-ACK feedback bits corresponding to the URLLC service according to both the K1 parameter and the time-domain resource assignment for PDSCH. The K1 parameter may be defined in terms of symbols or slots. In another example, the UE may be configured to multiplex HARQ-ACK feedback bits corresponding to the URLLC service according to the time-domain resource assignment for PDSCH when the K1 parameter is equal to 0. In this example, The K1 parameter may be defined in terms of slots. The multiplexing may be determined per slot when the K1 parameter is greater than 0.

Illustrative Implementations

Figure 2:
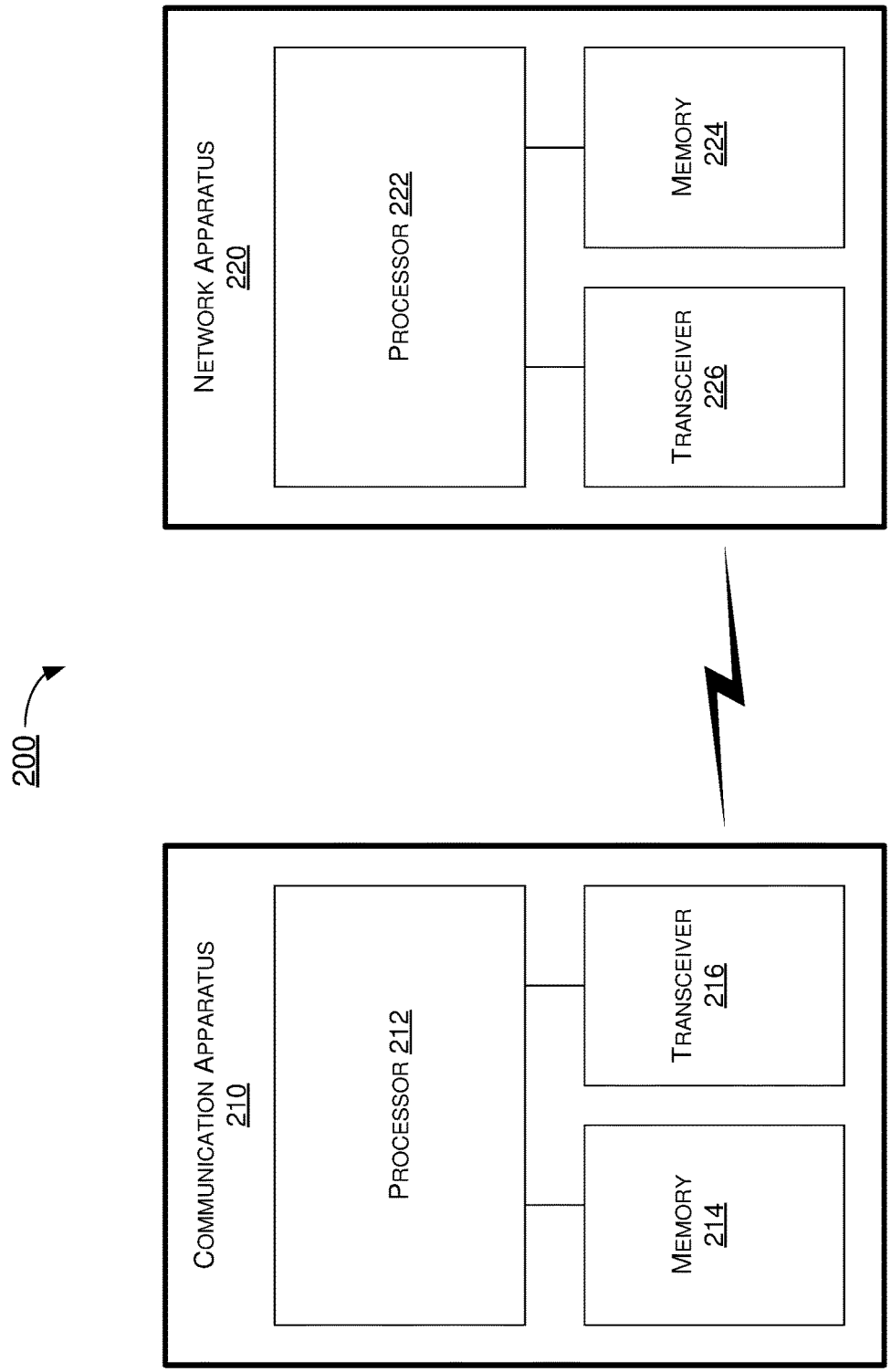
FIG. 2 is a block diagram of an example communication apparatus and an example network apparatus in accordance with an implementation of the present disclosure.

FIG. 2 illustrates an example communication apparatus 210 and an example network apparatus 220 in accordance with an implementation of the present disclosure. Each of communication apparatus 210 and network apparatus 220 may perform various functions to implement schemes, techniques, processes and methods described herein pertaining to reporting HARQ-ACK information for different service types with respect to user equipment and network apparatus in wireless communications, including schemes described above as well as process 300 described below.

Communication apparatus 210 may be a part of an electronic apparatus, which may be a UE such as a portable or mobile apparatus, a wearable apparatus, a wireless communication apparatus or a computing apparatus. For instance, communication apparatus 210 may be implemented in a smartphone, a smartwatch, a personal digital assistant, a digital camera, or a computing equipment such as a tablet computer, a laptop computer or a notebook computer. Communication apparatus 210 may also be a part of a machine type apparatus, which may be an IoT or NB-IoT apparatus such as an immobile or a stationary apparatus, a home apparatus, a wire communication apparatus or a computing apparatus. For instance, communication apparatus 210 may be implemented in a smart thermostat, a smart fridge, a smart door lock, a wireless speaker or a home control center. Alternatively, communication apparatus 210 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. Communication apparatus 210 may include at least some of those components shown in FIG. 2 such as a processor 212, for example. Communication apparatus 210 may further include one or more other components not pertinent to the proposed scheme of the present disclosure (e.g., internal power supply, display device and/or user interface device), and, thus, such component(s) of communication apparatus 210 are neither shown in FIG. 2 nor described below in the interest of simplicity and brevity.

Network apparatus 220 may be a part of an electronic apparatus, which may be a network node such as a base station, a small cell, a router or a gateway. For instance, network apparatus 220 may be implemented in an eNodeB in an LTE, LTE-Advanced or LTE-Advanced Pro network or in a gNB in a 5G, NR, IoT or NB-IoT network. Alternatively, network apparatus 220 may be implemented in the form of one or more IC chips such as, for example and without limitation, one or more single-core processors, one or more multi-core processors, or one or more RISC or CISC processors. Network apparatus 220 may include at least some of those components shown in FIG. 2 such as a processor 222, for example. Network apparatus 220 may further include one or more other components not pertinent to the proposed scheme of the present disclosure (e.g., internal power supply, display device and/or user interface device), and, thus, such component(s) of network apparatus 220 are neither shown in FIG. 2 nor described below in the interest of simplicity and brevity.

In one aspect, each of processor 212 and processor 222 may be implemented in the form of one or more single-core processors, one or more multi-core processors, or one or more RISC or CISC processors. That is, even though a singular term "a processor" is used herein to refer to processor 212 and processor 222, each of processor 212 and processor 222 may include multiple processors in some implementations and a single processor in other implementations in accordance with the present disclosure. In another aspect, each of processor 212 and processor 222 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 212 and processor 222 is a special-purpose machine specifically designed, arranged and configured to perform specific tasks including power consumption reduction in a device (e.g., as represented by communication apparatus 210) and a network (e.g., as represented by network apparatus 220) in accordance with various implementations of the present disclosure.

In some implementations, communication apparatus 210 may also include a transceiver 216 coupled to processor 212 and capable of wirelessly transmitting and receiving data. In some implementations, communication apparatus 210 may further include a memory 214 coupled to processor 212 and capable of being accessed by processor 212 and storing data therein. In some implementations, network apparatus 220 may also include a transceiver 226 coupled to processor 222 and capable of wirelessly transmitting and receiving data. In some implementations, network apparatus 220 may further include a memory 224 coupled to processor 222 and capable of being accessed by processor 222 and storing data therein. Accordingly, communication apparatus 210 and network apparatus 220 may wirelessly communicate with each other via transceiver 216 and transceiver 226, respectively. To aid better understanding, the following description of the operations, functionalities and capabilities of each of communication apparatus 210 and network apparatus 220 is provided in the context of a mobile communication environment in which communication apparatus 210 is implemented in or as a communication apparatus or a UE and network apparatus 220 is implemented in or as a network node of a communication network.

In some implementations, processor 212 may be configured to establish, via transceiver 216, at least one connection with network apparatus 220. Processor 212 may be configured with URLLC and/or eMBB services. Processor 212 may receive, via transceiver 216, DCI from network apparatus 220. The DCI may schedule a downlink transmission (e.g., PDSCH) corresponding to the URLLC and/or eMBB services. Processor 212 may be configured to decode the DCI scheduling the PDSCH. Processor 212 may be configured to determine a service type corresponding to the PDSCH for HARQ feedback process. Processor 212 may be configured to determine whether a HARQ feedback latency is critical. In an event that the HARQ feedback latency is critical, processor 212 may be configured to perform a URLLC HARQ feedback process. Processor 212 may report the HARQ-ACK information more instantaneous to reduce latency and meet the HARQ feedback latency requirement of URLLC service. In an event that the HARQ feedback latency is not critical, processor 212 may be configured to perform an eMBB HARQ feedback process. Processor 212 may be able to report the HARQ-ACK information regularly or in a HARQ-ACK codebook since the HARQ feedback latency requirement of eMBB service is not critical.

In some implementations, processor 212 may be configured to determine/recognize a service type of a scheduled transmission based on some properties of the DCI. For example, processor 212 may be configured to determine the service type according to an RNTI used by the DCI. A specific RNTI may be defined for the URLLC service. In an event that the same DCI format for scheduling is scrambled with a service-specific RNTI for URLLC, processor 212 may be able to implicitly recognize the associated service type of the scheduling DCI based on which RNTI can successfully decode the scheduling DCI.

In some implementations, processor 212 may be configured to determine the service type according to a PDCCH search space or a type of a PDCCH search space for the DCI. A UE-specific PDCCH search space may be configured in a CORESET. Processor 212 may be configured with multiple search spaces for different PDCCH candidates. In NR, network apparatus 220 may configure a UE-specific search space for a PDCCH via UE-specific RRC signal. In an event that the scheduling DCI for URLLC and eMBB services are positioned in different PDCCH search spaces, processor 212 may be able to identify the correct DCI for each corresponding service type.

In some implementations, in an event that processor 212 detects multiple scheduling DCI in a CORESET, processor 212 may be configured to recognize them based on the specified/pre-determined rules. For example, the DCI for URLLC may be always configured at an earlier OFDM symbol than DCI for eMBB. Processor 212 may be configured to determine different service types according to different DCI positions. Network apparatus 220 may configure the PDCCH search space restrictions by RRC signalling. For example, processor 220 may be configured to signal the configurable service types by scheduling DCI in a certain PDCCH search space. Processor 220 may signal it in the same RRC message configuring the UE-specific PDCCH search spaces. Furthermore, the PDCCH search space restrictions may also be extended to a dedicated CORESET. For example, processor 212 may also use a certain CORESET monitoring occasion to identify a service-type.

In some implementations, processor 212 may be configured to determine the service type according to at least one of a DCI format of the DCI, a DCI field of the DCI, and a payload size of the DCI. For example, in an event that a different or specific DCI format is defined specifically for the scheduling DCI for URLLC, processor 212 may be configured to identify the corresponding service type from the DCI format. A compact-sized DCI with a small payload size may be used for the URLLC service. In another example, processor 212 may use a certain DCI field (e.g., MCS table, number of bits in a certain field, etc.) to determine whether the DCI schedules a URLLC or eMBB transmission. In another example, the DCI scheduling URLLC should have smaller payload size than the DCI scheduling eMBB. Processor 212 may be able to differentiate different service types according to different payload sizes. Different mechanisms for indication of payload size may be considered and any of such indication may also be interpreted by processor 212 to identify service type.

In some implementations, network apparatus 220 may configure different PUCCH resources for uplink transmission of HARQ feedback bits for different service type traffics. Network apparatus 220 may configure a dedicated PUCCH resource set for high-priority (e.g., URLLC) service types. Network apparatus 220 may configure one or more PUCCH resource sets to be restricted only for URLLC-type services. Communication apparatus 210 procedures of selecting a PUCCH resource set may involve determining the service type as well as the required number of bits. For example, processor 222 may configure the dedicated PUCCH resource sets only with PUCCH resources that are configured as short-PUCCH formats. Processor 212 may be able to select these PUCCH resources for transmitting the HARQ-ACK information corresponding to URLLC service. For example, processor 212 may be configured to select a URLLC-specific PUCCH resource in an event that the service type is the URLLC service. In another example, processor 212 may be configured to select a nearest PUCCH resource in time in an event that the service type is the URLLC service.

In some implementations, after the PUCCH resource set is determined, the selection of the PUCCH resource may be based on a combination of a K1 parameter and a PDSCH time-domain resource assignment field. Processor 212 may be configured to select the PUCCH resource (e.g., HARQ-ACK resource) according to at least one of a slot or symbol indication (e.g., K1 parameter) and a time-domain resource assignment. Specifically, processor 222 may use the K1 parameter to indicate the slot for the HARQ-ACK resource. Processor 222 may use the last symbol of the PDSCH transmission to indicate the first symbol of the HARQ-ACK resource or the first available HARQ-ACK symbol after the last PDSCH symbol index. For example, in an event that K1 is equal to 1, processor 212 may be configured to select the HARQ-ACK resource on the next symbol index after the last PDSCH symbol index in the next slot. In another example, processor 222 may configure a supplementary parameter (e.g., similar to K1 but in terms of symbols) to UE via RRC signalling. This new parameter (e.g., K'1) may not be smaller than the N1 capability for communication apparatus 210 and semi-statically configured. In this case, the first HARQ-ACK resource in time-domain after the K'1 offset from the last symbol of the PDSCH transmission may be selected by processor 212.

In some implementations, processor 222 may use the last symbol of the PDSCH transmission to indicate the first symbol of the HARQ-ACK resource or the first available HARQ-ACK symbol after the last PDSCH symbol index only in an event that the K1 parameter is equal to 0. Otherwise, processor 222 may use an ARI field to indicate the HARQ-ACK resource. Alternatively, processor 222 and/or processor 212 may use both the last and first symbol of the PDSCH transmission to determine the first symbol of the HARQ-ACK resource.

In some implementations, processor 212 may be configured to cancel a multiplexing of HARQ-ACK feedback bits corresponding to the URLLC service. Alternatively, processor 212 may be configured to multiplex HARQ-ACK feedback bits corresponding to the URLLC service according to at least one of a slot or symbol indication and a time-domain resource assignment. Processor 222 may use a higher-layer (e.g., RRC layer) parameter to configure whether communication apparatus 210 is allowed to multiplex HARQ-ACK feedback bits corresponding to the URLLC service.

In some implementations, processor 212 may be configured to multiplex HARQ-ACK feedback bits corresponding to the URLLC service according to the K1 parameter. The K1 parameter may be defined in terms of symbols or slots. In an event that at least two K1 parameters indicate to the same symbol or slot, processor 212 may be configured to multiplex the corresponding HARQ-ACK feedback bits and transmit the HARQ-ACK feedback bits to network apparatus 220 together. In another example, processor 212 may be configured to multiplex HARQ-ACK feedback bits corresponding to the URLLC service according to both the K1 parameter and the time-domain resource assignment for PDSCH. The K1 parameter may be defined in terms of symbols or slots. In another example, processor 212 may be configured to multiplex HARQ-ACK feedback bits corresponding to the URLLC service according to the time-domain resource assignment for PDSCH when the K1 parameter is equal to 0. In this example, The K1 parameter may be defined in terms of slots. Processor 212 may determine the multiplexing per slot when the K1 parameter is greater than 0.

Illustrative Processes

Figure 3:
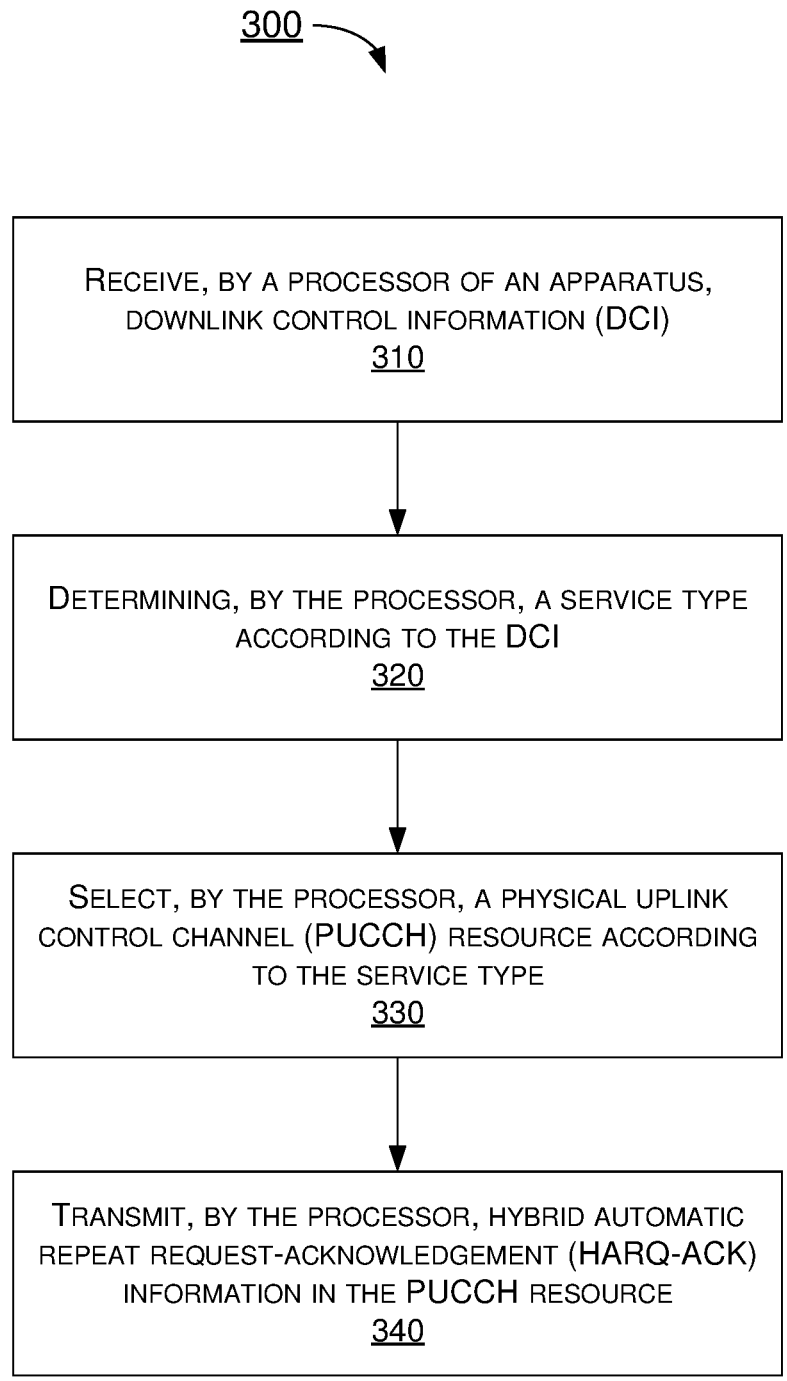
FIG. 3 is a flowchart of an example process in accordance with an implementation of the present disclosure.

FIG. 3 illustrates an example process 300 in accordance with an implementation of the present disclosure. Process 300 may be an example implementation of schemes described above, whether partially or completely, with respect to reporting HARQ-ACK information for different service types with the present disclosure. Process 300 may represent an aspect of implementation of features of communication apparatus 210. Process 300 may include one or more operations, actions, or functions as illustrated by one or more of blocks 310, 320, 330 and 340. Although illustrated as discrete blocks, various blocks of process 300 may be divided into additional blocks, combined into fewer blocks, or eliminated, depending on the desired implementation. Moreover, the blocks of process 300 may executed in the order shown in FIG. 3 or, alternatively, in a different order. Process 300 may be implemented by communication apparatus 210 or any suitable UE or machine type devices. Solely for illustrative purposes and without limitation, process 300 is described below in the context of communication apparatus 210. Process 300 may begin at block 310.

At 310, process 300 may involve processor 212 of apparatus 210 receiving DCI. Process 300 may proceed from 310 to 320.

At 320, process 300 may involve processor 212 determining a service type according to the DCI. Process 300 may proceed from 320 to 330.

At 330, process 300 may involve processor 212 selecting a PUCCH resource according to the service type. Process 300 may proceed from 330 to 340.

At 340, process 300 may involve processor 212 transmitting HARQ-ACK information in the PUCCH resource.

In some implementations, process 300 may involve processor 212 determining the service type according to an RNTI used by the DCI.

In some implementations, process 300 may involve processor 212 determining the service type according to a PDCCH search space or a type of a PDCCH search space for the DCI.

In some implementations, process 300 may involve processor 212 determining the service type according to at least one of a DCI format of the DCI, a DCI field of the DCI, and a payload size of the DCI.

In some implementations, the service type may comprise at least one of a URLLC service and an eMBB service.

In some implementations, process 300 may involve processor 212 selecting a URLLC-specific PUCCH resource in an event that the service type is the URLLC service.

In some implementations, process 300 may involve processor 212 selecting a nearest PUCCH resource in time in an event that the service type is the URLLC service.

In some implementations, process 300 may involve processor 212 selecting the PUCCH resource according to at least one of a slot or symbol indication and a time-domain resource assignment.

In some implementations, process 300 may involve processor 212 cancelling a multiplexing of HARQ-ACK feedback bits corresponding to the URLLC service in an event that the service type is the URLLC service.

In some implementations, process 300 may involve processor 212 multiplexing HARQ-ACK feedback bits corresponding to the URLLC service according to at least one of a slot or symbol indication and a time-domain resource assignment, in an event that the service type is the URLLC service.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
receiving, by a processor of an apparatus, downlink control information (DCI);
determining, by the processor, a service type according to the DCI, wherein the service type comprises at least one of an ultra-reliable and low latency communications (URLLC) service and an Enhanced Mobile Broadband (eMBB) service;
selecting, by the processor, a physical uplink control channel (PUCCH) resource according to the service type;
transmitting, by the processor, hybrid automatic repeat request-acknowledgement (HARQ-ACK) information in the PUCCH resource; and
cancelling, by the processor, a multiplexing of HARQ-ACK feedback bits corresponding to the URLLC service in an event that the service type is the URLLC service.

2. The method of claim 1, wherein the determining comprises determining the service type according to a radio network temporary identifier (RNTI) used by the DCI.

3. The method of claim 1, wherein the determining comprises determining the service type according to a PDCCH search space or a type of a PDCCH search space for the DCI.

4. The method of claim 1, wherein the determining comprises determining the service type according to at least one of a DCI format of the DCI, a DCI field of the DCI, and a payload size of the DCI.

5. The method of claim 1, wherein the selecting comprises selecting a URLLC-specific PUCCH resource in an event that the service type is the URLLC service.

6. The method of claim 1, wherein the selecting comprises selecting a nearest PUCCH resource in time in an event that the service type is the URLLC service.

7. The method of claim 1, wherein the selecting comprises selecting the PUCCH resource according to at least one of a slot or symbol indication and a time-domain resource assignment.

8. The method of claim 1, further comprising:
multiplexing, by the processor, HARQ-ACK feedback bits corresponding to the URLLC service according to at least one of a slot or symbol indication and a time-domain resource assignment, in an event that the service type is the URLLC service.

9. An apparatus, comprising:
a transceiver capable of wirelessly communicating with a network node of a wireless network; and
a processor communicatively coupled to the transceiver, the processor configured to perform operations comprising:
receiving, via the transceiver, downlink control information (DCI);
determining a service type according to the DCI, wherein the service type comprises at least one of an ultra-reliable and low latency communications (URLLC) service and an Enhanced Mobile Broadband (eMBB) service;
selecting a physical uplink control channel (PUCCH) resource according to the service type;
transmitting, via the transceiver, hybrid automatic repeat request-acknowledgement (HARQ-ACK) information in the PUCCH resource; and
cancelling a multiplexing of HARQ-ACK feedback bits corresponding to the URLLC service in an event that the service type is the URLLC service.

10. The apparatus of claim 9, wherein, in determining the service type according to the DCI, the processor is capable of determining the service type according to a radio network temporary identifier (RNTI) used by the DCI.

11. The apparatus of claim 9, wherein, in determining the service type according to the DCI, the processor is capable of determining the service type according to a PDCCH search space or a type of a PDCCH search space for the DCI.

12. The apparatus of claim 9, wherein, in determining the service type according to the DCI, the processor is capable of determining the service type according to at least one of a DCI format of the DCI, a DCI field of the DCI, and a payload size of the DCI.

13. The apparatus of claim 9, wherein, in selecting the PUCCH resource according to the service type, the processor is capable of selecting a URLLC-specific PUCCH resource in an event that the service type is the URLLC service.

14. The apparatus of claim 9, wherein, in selecting the PUCCH resource according to the service type, the processor is capable of selecting a nearest PUCCH resource in time in an event that the service type is the URLLC service.

15. The apparatus of claim 9, wherein, in selecting the PUCCH resource according to the service type, the processor is capable of selecting the PUCCH resource according to at least one of a slot or symbol indication and a time-domain resource assignment.

16. The apparatus of claim 9, wherein the processor is further capable of:
multiplexing HARQ-ACK feedback bits corresponding to the URLLC service according to at least one of a slot or symbol indication and a time-domain resource assignment, in an event that the service type is the URLLC service.

* * * * *